United States Patent
Slocum

[11] 3,799,584
[45] Mar. 26, 1974

[54] CORROSION RESISTANT SEAL FOR COMPRESSION COUPLINGS

[75] Inventor: Fred H. Slocum, Pittsburgh, Pa.

[73] Assignee: Robroy Industries, Verona, Pa.

[22] Filed: Oct. 5, 1972

[21] Appl. No.: 295,227

Related U.S. Application Data

[63] Continuation-in-part of Ser. No. 176,203, Aug. 30, 1971, abandoned.

[52] U.S. Cl................. 285/45, 85/1 JP, 85/32 R, 277/64, 285/342, 285/354
[51] Int. Cl. ....... F16l 9/14, F16l 19/06, F16l 55/00
[58] Field of Search .................. 85/1 C, 1 JP, 32 R; 277/64; 285/45, 47, 52, 55, 342, 354

[56] References Cited
UNITED STATES PATENTS

| | | | |
|---|---|---|---|
| 2,388,097 | 10/1945 | Turner | 285/45 X |
| 2,998,984 | 9/1961 | Gressel | 285/55 |
| 3,194,592 | 7/1965 | Boughton | 285/342 |
| 3,535,136 | 10/1970 | Beene | 285/45 UX |

*Primary Examiner*—Mervin Stein
*Assistant Examiner*—David H. Corbin
*Attorney, Agent, or Firm*—Stanley J. Price, Jr.

[57] ABSTRACT

An improved corrosion resistant seal for compression coupling devices includes threadably engageable male and female coupling members. Each of said respective coupling members has an insulating, moisture resistant, resilient, polymeric coating, such as a polyvinylchloride coating bonded to the metal substrate. Both male and female coupling member coatings terminate in respective annular resilient flange portions. Each of the annular flange portions extends radially of its respective coupling member in a manner whereby threadably engaging and advancing male and female members results in contact of the respective flange portions providing an effective moisture seal therebetween and an effective insulating coupling that prevents galvanic and chemical corrosion thereof. A further embodiment of the improved corrosion resistant seal for compression couplings includes a male coupling member coating continued beyond the adjacent resilient flange portion and terminating in a threaded portion adjacent the matching threads of the male coupling member. The male coupling member completely engages the female coupling member when all the threads of the female coupling extend over all the threads of the male coupling member and engage the threaded portion of the male coupling member coating. An effective moisture seal is first provided by the contact of the respective resilient flanges of the male and female coupling members when the threaded portion of the female member initially engages the threaded portion of the male member.

7 Claims, 7 Drawing Figures

CORROSION RESISTANT SEAL FOR COMPRESSION COUPLINGS

CROSS-REFERENCE TO RELATED APPLICATION

This application is a continuation-in-part of copending U.S. application, Ser. No. 176,203, entitled "Improved Corrosion Resistant Seal For Compression Couplings And The Like," filed Aug. 30, 1971, now abandoned.

BACKGROUND OF THE INVENTION

1. Field of the Invention

This invention relates to compression coupling devices and more particularly to an improved corrosion resistant seal for compression couplings.

2. Description of the Prior Art

Compression coupling devices are well known in the art. Such coupling devices have application in preparing nonwelded pipeline assemblies and have special value in pipeline assemblies which must be occasionally disassembled along the pipeline path for maintenance work and the like. A typical application for such coupling is in the preparation of a gas pipeline for transporting gas from a main gas line to the home of an individual user. In most cases the gas pipeline is located beneath the ground where the pipeline is subjected to a corrosive environment and where corrosive moisture can easily enter into a pipe coupling member. Moisture on the components of the coupling device and thread corrosion is generally the principal cause of leaks in underground, coupled pipeline assemblies.

Typical compression coupling assemblies are shown in U.S. Pat. Nos. 3,194,592 and 2,816,472. Such coupling devices generally comprise a coupling nut assembly, including threadably engageable male and female coupling portions and a compressible washer or disc having an inside diameter slightly larger than the outside diameter of a pipe being coupled with the device. Threadably advancing the male portion into the female portion results in compression of the washer whereby a pipe telescoping into the coupling is engaged and held in place. The components of such couplings are liable to corrosive damage and, additionally, can become "frozen" due to that corrosion in their threaded portions. Freezing of the coupling can render it useless in the extreme case and can create difficult maintenance problems when the coupling must be disengaged, for example, in the replacement of a section of pipe. In addition, using such devices to couple pipes of varying diameter within the commercial pipe tolerances results in premature compression of the washer as the male member is threadably engaged into the female member exposing the threads of the male member to galvanic and chemical corrosion.

U.S. Pat. No. 3,535,136 discloses a method for powder-coating a cylindrical member with a thermoplastic coating material to provide a sealing engagement with a pliable sleeve extending from another coated member. The thermoplastic coating covering the cylindrical member terminates in a peripheral projection encircling the cylindrical member. When the cylindrical member is threadably engaged to another member having a resilient sleeve formed thereon, the sleeve fits over the peripheral projection to provide a sealing engagement between the pliable sleeve and the coating on the cylindrical member.

U.S. Pat. No. 2,998,984 teaches mechanically joining the shells of successive sections of lined pipe to provide a fluid-tight seal. Flange portions formed by end portions of a lining extending beyond the ends of the shells flare outwardly and are continually pressed together by the coupling members in a fluid-tight joint.

U.S. Pat. No. 2,388,097 discloses an elastic resilient protector in the form of a cylindrical sleeve having flanged ends made of rubber. The protector body is disposed around a cylindrical member to produce a sealed enclosure impervious to the corrosive action of abrasive particles.

In conventional methods of precoating a coupling and assembly an effective moisture resistant seal is not provided until the male member is completely engaged into the female member. A seal of this type is inadequate for field installation for the reason that moisture and dirt can easily enter into a coupling and assembly while the male coupling member is threadably advancing into the female coupling member prior to complete engagement of the coupling members to form an effective moisure resistant seal. Further problems are encountered in providing a moisture resistant seal to pipes of any diameter coupled together exposing the threads of the coupling and assembly to a corrosive environment.

The object of this invention is to provide a means to coat the coupling devices prior to installation in the field and to eliminate the problem of exposing threads on the fittings to moisture during installation of the coupling devices in the field.

Another object of this invention is to provide an improved sealed compression coupling joint which may be rapidly assembled and disassembled and whose components are effectively sealed against damage due to moisture or foreign material.

A further object of this invention is to provide a moisture resistant seal for the exposed pipe threads of a compression coupling joint for pipes having varying diameter within the commercial pipe tolerances.

It is still another object of this invention to provide an improved seal for compression couplings suitable for underground use over long periods of time without the danger of excessive corrosion damage or "freezing" of the coupling joint.

SUMMARY OF THE INVENTION

This invention provides an improved moisture seal for a corrosion resistant compression coupling device including threadably engageable male and female coupling members. EAch of the respective coupling members has a moisture resistant, insulating, resilient, polymeric coating. Preferably the coating comprises a polyvinylchloride coating. Both male and female coupling member coatings terminate in respective annular resilient flange portions. Each of the resilient flange portions extends radially of its respective coupling member forming respective radial flanges thereon. Threadably advancing the male coupling member into the female coupling member converges the respective radial flange portions of the male and female coupling members into abutting relationship substantially along the entire surface area of the lip portions of the radial flanges forming an effective moisture and dirt seal therebetween.

A preferred embodiment of the improved corrosion resistant seal for compression couplings includes an effective moisture resistant seal formed by the contacting of the outermost lip portions of the respective radial flange portions of the male and female coupling members as the male coupling member is threadably advanced into the female coupling member. At the initial point of engaging the male and female coupling portions, the radial flange portions of the coupling members have sufficient structural strength to resist damage due to stresses applied to the initial seal formed by the abutting outermost lip portions of the radial flanges. The polymeric coating protecting the male coupling member terminates in a threaded radial flange portion. The threaded portion of the radial flange abuts the furthermost thread of the male coupling member as the male coupling member is advanced into the female coupling member. The coupling joint is complete when all of the threads of the male coupling member extend in overlying relationship to all of the threads of the female coupling member and the female coupling member has engaged the threads of the threaded portion of the radial flange. Engagement of the female coupling member with the threaded portion of the radial flange formed on the male coupling member provides a further seal between the male and female coupling members protecting the coupling members from galvanic and chemical corrosion.

DESCRIPTION OF THE PREFERRED EMBODIMENTS

Figure 1:
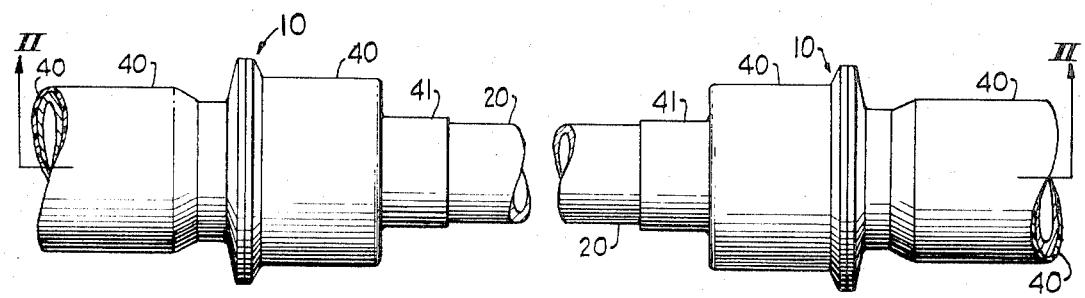
FIG. 1 is a fragmented view in side elevation of the sealed compression coupling joints according to the invention located in a pipeline.
Figure 2:
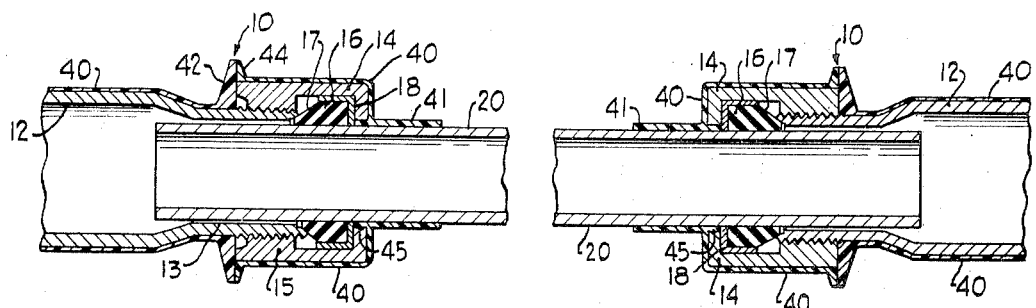
FIG. 2 is a fragmented sectional view in side elevation taken along the line II—II of FIG. 1.

Referring now to FIGS. 1 and 2, a pair of sealed compression coupling joints of this invention generally indicated by the numeral 10 are located in a pipeline including pipe 20. Coupling joints 10 include threadably engageable male coupling members 12 and female coupling members 14. Male coupling member 12 has an external screw portion 13 and female coupling member 14 has an internal screw portion 15. The coupling nut assembly shown in the Figures is substantially that as described in U.S. Pat. No. 3,194,592 and includes in addition to threadably engageable male and female members 12 and 14 a compressible annular gasket or washer 16 and a metallic seat 18 for washer 16. It is found in conventional practice that the female coupling member is threadably advanced into the male coupling member; however, it is a feature of this invention that either member may be threadably advanced into the other, and for the purpose of convenience, reference will be made to threadably advancing the male coupling member into the female coupling member. As illustrated in FIG. 2, threadably advancing male coupling member 12 into female coupling member 14 results in contact of the leading edge of male coupling member 12 with a wedging surface 17 on annular washer 16. In that fashion compressible washer 16 is compressed into tight, grasping contact with pipe 20 telescoping into the coupling nut assembly to thereby engage and hold the pipe. It should be noted that while the improved moisture and dirt seal for compression coupling devices of the invention is described with respect to the particular nut assembly shown, that the novel seal of the invention is not limited in application thereto. Rather, the seal may be employed with various coupling devices.

Figure 3:
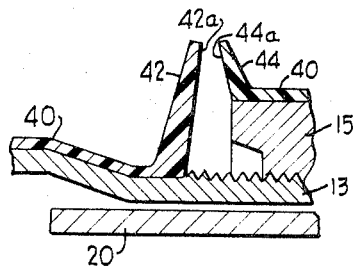
FIG. 3 is a detailed cross-sectional view in side elevation of the resilient, radial flange seal of this invention in an open position.

Male coupling member 12 and female coupling member 14 are provided with a moisture resistant (impervious), insulating resilient polymeric coating 40 bonded to the metal substrate. Coating 40 preferably comprises a moisture impervious, chemical resistant, impact resistant, polymeric composition. Most preferably, coating 40 comprises a polyvinylchloride (PVC) film, but equivalent compositions may likewise be employed. For example, impact resistant polymeric coatings such as nylon, polyethylene, polypropylene, polyurethane resins and the like may be suitable. Coating 40 protects male coupling member 12 and female coupling member 14 from corrosion damage due to moisture, e.g., as by providing not only an effective moisture seal but also by providing an effective insulating medium against galvanic corrosion due to alkaline or acid soil conditions. Coating 40 on male and female coupling members 12 and 14 terminates in respective resilient flange portions 42 and 44 thereon. Each of the respective flange portions 42 and 44 extends radially of its respective coupling member in a manner whereby a radial flange is formed on each coupling member. Owing to their resilient polymeric composition, each of said flanges 42 and 44 is somewhat pliable or resilient. In addition, flanges 42 and 44 each preferably have a substantially flat surface portion as at 42a and 44a respectively (FIG. 3). Most preferably, flanges 42 and 44 extend radially from male and female coupling members 12 and 14 respectively at an angle inclining somewhat away from the vertical. Inclining the flanges in that fashion and providing a flat surface therefor aids in providing an effective seal according to the invention, as will be more fully explained hereinafter.

Figure 4:
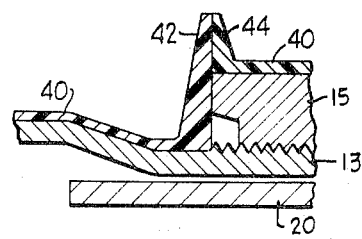
FIG. 4 is a detailed sectional view in side elevation of the resilient, radial flange seal of this invention in a closed position.

Flange 42 radially extending from male coupling member 12 extends therefrom at a point near the trailing end of external screw portion 13 of male coupling member 12 and thereby leaves exposed the threads thereon. Flange 44 extending radially from internal screw portion 15 of female coupling member 14 extends therefrom at a point near the leading edge of internal screw portion 15. As explained hereinabove, threadably advancing male portion 12 into female portion 14 of the coupling nut shown, as by turning either coupling member, results in contact of the leading edge of external screw portion 13 of male coupling member 12 with compressible washer means 16 whereby pipe 20 is securely coupled by the coupling nut assembly. In addition, such threadable advancement of the coupling nut assembly results in contact of flanges 42 and 44 extending radially from their respective coupling members. As best shown in FIG. 3, inclined flanges 42 and 44 may first contact each other for providing a seal along their respective uppermost edges. Further advancement of male coupling member 12 permits everincreasing areas of surface portions 42a and 44a to come into contact for providing an effective radial seal between the coupling members 12 and 14 whereby moisture and other foreign materials are prevented from entering the coupling nut assembly. Most preferably, the completed seal as formed by abutting radially extending flange portions 42 and 44 comprises a radial seal having a substantial abutting flange surface area, as is shown in FIG. 4; but adequate sealing may be achieved as long as portions of the lip surfaces are in abutting relation.

It may best be appreciated here that the sealed coupling assembly according to the invention may provide an effective corrosion resistant, sealed coupling assembly for pipes having varying diameter. For example, a pipe of the same nominal size as pipe 20 with an enlarged diameter, i.e., greater than the diameter of pipe 20 and within the commercial pipe diameter tolerances, may be coupled so that it is fully engaged by the compression gasket 16 with fewer turns of the male member 12. The premature engagement of the compression gasket 16 prevents the male member 12 from engaging all of the threads on threaded portion 15 of the female member 14, thus leaving exposed threads on the male member 14. However, the lip portions 42 and 44 are arranged to be engaged or abut each other irrespective of the pipe diameter as long as the pipe is within commercial tolerances of diameter. For example, as viewed in FIG. 3, a few more turns of the male member 12 will engage the outer portion of the flanges 42 and 44 to provide an effective seal even though the male member 12 does not extend over all of the threads of the female member 14. In any case, an effective moisture seal is formed by resilient, radial flanges 42 and 44 of a coupling assembly. The coupling joints 10 are provided with additional protection from damage caused by galvanic and chemical corrosion by extending coating 40 beyond female coupling member 14 as a sleeve 41. In order to electrically insulate the female coupling member 14 from the corrosive action of stray currents which may pass from the pipe 20 to member 14, end portions 45 of coating 40 extend to abut the metallic seat 18 for washer 16.

Figure 5:
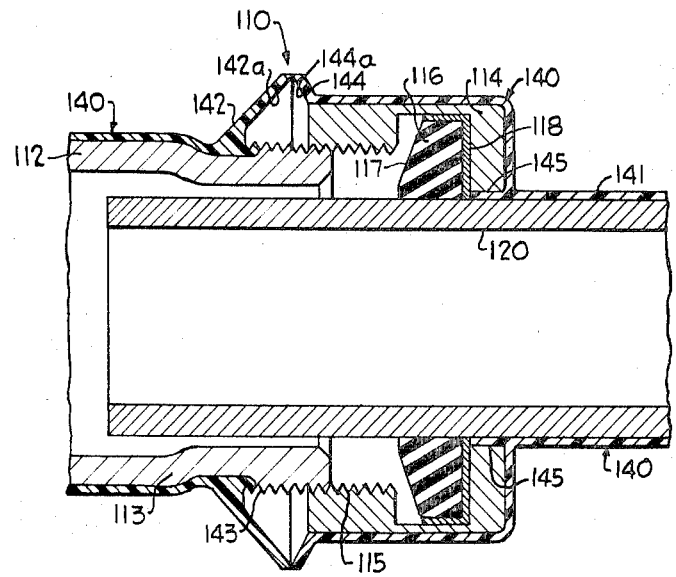
FIG. 5 is a detailed sectional view of another embodiment of the resilient, radial flange seal of the invention in the initial closed position.

Referring to FIG. 5, another embodiment of the invention is illustrated in which similar parts will be designated by similar numerals increased by one hundred.

A coupling nut assembly 110, as shown in FIG. 5, includes male coupling member 112 and female coupling member 114 provided with a moisture resistant, insulating, resilient polymeric coating 140 bonded to the metal substrate identical to the polymeric coating described in FIGS. 1 and 2. Resilient flange portions 142 and 144 projecting from the ends of the respective male and female coupling members 112 and 114 extend outwardly of the coupling members at an angle inclined from vertical. In this embodiment an effective seal is provided by the contacting of the projecting flange portions 142 and 144 when the male coupling member 112 becomes threadably engaged to the female coupling member 114 at the initial position of engagement.

An effective seal for the coupling nut assembly 110 is formed when the lip portions 142a and 144a of the resilient flanges 142 and 144 contact each other at an angle inclined from the vertical. As the male coupling member 112 is threadably advanced into the female coupling member 114 of the coupling nut assembly 110 by turning either coupling member, the radially extending inclined flange portions 142 and 144 first contact each other at the respective uppermost edges. In this position an effective seal for the coupling nut assembly 110 is provided at the initial point of engagement of the male coupling member 112 with the female coupling member 114. Radial seal between the coupling members at the initial stage of engagement between the coupling members has sufficient structural strength to resist the mechanical stresses applied to the coupling nut assembly 112 during field installation and thereafter.

The thickness of the abutting lip portions 142a and 144a provides sufficient structural strength to enable the resilient flange portions to resist impact while employed below ground level at the initial engagement position. In this manner an effective moisture seal is fully provided, particularly in the circumstance when pipes of varying diameter within the commercial pipe tolerances are coupled together protecting the exposed threads of the coupling assembly from a corrosive environment.

Figure 6:
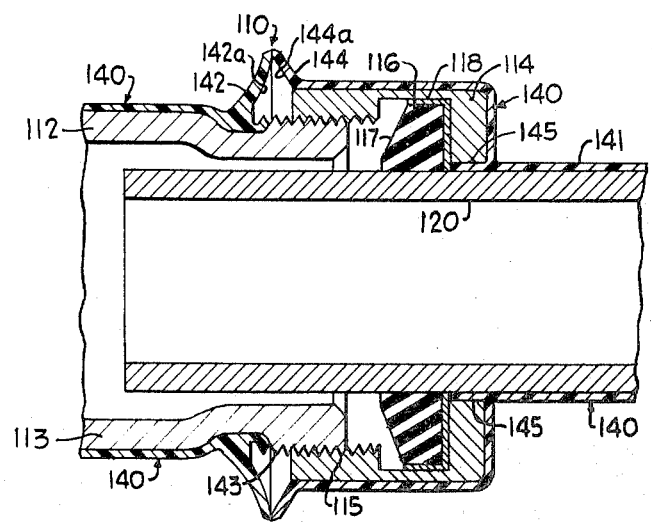
FIG. 6 is a detailed sectional view of the embodiment illustrated in FIG. 5 of the resilient flange seal of this invention in an intermediate position.

As the male coupling member 112 is threadably advanced further into the female coupling member 114 by additional turns of the coupling member 112 the uppermost lip portions 142a and 144a of the resilient flanges converge providing a greater surface area of contact between the abutting flange portions as shown in FIG. 6. The resilient property of the radially extending flange portions 142 and 144 permit the flat surfaces of the lips 142a and 144a to converge toward the vertical. Preferably, as the flat surface of the lips 142a and 144a converge toward a vertical position the adjacent surface areas not in abutting relationship tend to form an arcuate configuration while an effective seal is provided along the respective uppermost edges of the inclined radial flanges 142 and 144. Similarly, as described above, threadably advancing male coupling member 112 into female coupling member 114 results in contact of the leading edge of male coupling member 112 with the wedging surface 117 on annular washer 116 retained in the metallic seat 118. Thus, the coupling nut assembly rigidly engages pipe 120 by compressing washer 116 into grasping contact with pipe 120. Still greater sealing capacity is provided by the further abutting of the increased surface areas of the inclined resilient flanges 142 and 144 in further turns of the male coupling member 112.

Figure 7:
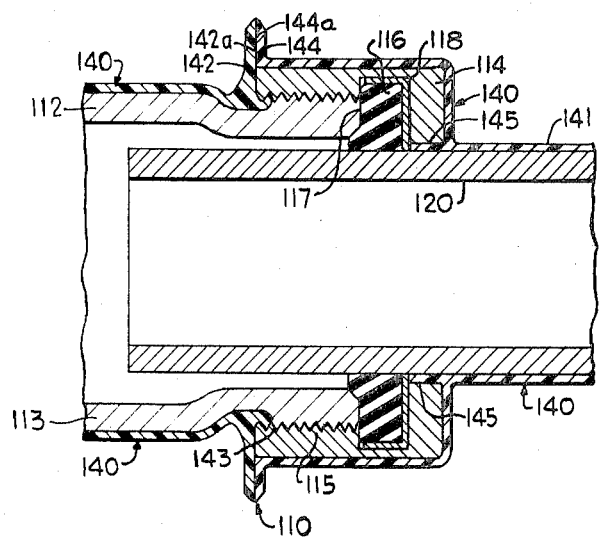
FIG. 7 is a detailed sectional view of the embodiment illustrated in FIG. 5 of the resilient, radial flange seal of the invention in a closed position.

Most preferably, a further seal is provided when the male coupling member 112 extends over all of the threads of the female coupling member 114. The threaded portion 115 of the female coupling member 114 engages the threaded portion 143 of the radial flange 142 formed on the male coupling member 112 beyond their position of complete engagement of the male coupling member 112 with the female coupling member 114. The threaded portion 143 of the radial flange 142 provides a uniform continuation of the external thread design of the male coupling member 112. Turning the male coupling member 112 to completely engage the threaded portion 143 of the radial flange 142 with the threaded portion 115 of the female coupling member 114 extends in overlying relationship all the threads of the male coupling 112 with all the threads of the female coupling 114. The engagement of the female coupling member 114 with the threaded portion 143 of the radial flange 142 completes the coupling joint to provide a further moisture resistant seal around the respective threaded end portions 113 and 115 of the male and female coupling members 112 and 114. By threadably advancing the male coupling member 112 into the female coupling member 114, the threaded portion 143 of the radial flange 142 engages the female coupling member 114. The engagement of the female coupling member 114 with the threaded portion 143 of the radial flange 142 urges the radially extending flange portions 142 and 144 to converge further until they abut substantially along their surface areas as illustrated in FIG. 7.

The completed coupling of the male coupling member with the female coupling member provides a moisture resistant seal comprising radially extending flange portions 142 and 144 having a substantial abutting flange surface area. The effective seal formed by the abutting radially extending flange portions 142 and 144 protects against corrosion caused by moisture and dirt entering around the threads of the male and female coupling members 112 and 114 of the coupling nut assembly 110.

Each of the flanges 142 and 144 have sufficient structural strength to form a radial seal capable of resisting the impact stresses applied to the coupling nut assembly 110 during field installation. The structural strength of the resilient flange prevents moisture and foreign material from passing through the seal and corroding or otherwise damaging the coupling nut assembly 110 when the improved seal of this invention is employed below ground. Further resistance to galvanic and chemical corrosion of the coupling nut assembly 110 is provided by extending the coating 140 beyond the female coupling member 114 as a sleeve 141. In addition, the end portion 145 of sleeve 141 electrically insulates the female coupling member 114 from corrosive stray currents which might pass through the pipe 120 to the female coupling member 114 and, in turn, through the entire coupling nut assembly 110.

According to the provisions of the patent statutes, I have explained the principle, preferred construction and mode of operation of my invention and have illustrated and described what I now consider its best embodiments. It should be understood that the invention is not limited to the particular embodiments described herein but may be variously practiced within the scope of the following claims.

I claim:

1. An improved corrosion resistant seal for compression coupling devices comprising,
   a male coupling member having an external threaded portion,
   a female coupling member having an internal threaded portion,
   a moisture resistant, resilient polymeric coating on each of said members, said coating on each of said members terminating in respective annular resilient flange portions thereon,
   each of said annular flange portions extending outwardly from its respective coupling member and including an annular flat face portion extending from the surface of its coupling member to an outer peripheral annular edge portion, the flange portion on said male coupling member extending therefrom at a position near the trailing end of said external threaded portion, the flange of said female coupling member extending therefrom at a position near the leading edge of said internal threaded portion, and
   the face portions of said annular flange portions extending at an angle to the vertical and facing each other with said outer peripheral annular edge portions being in closer proximity than the face portions adjacent the respective coupling surfaces so that upon engaging and advancing said male and female coupling members toward each other results in contact of said respective annular face portions of said annular flange portions adjacent the outer peripheral annular edge portions prior to all of the threads of one of said members being in overlying relation with the threads of the other of said members for forming an effective seal therebetween.

2. An improved corrosion resistant seal for the compression coupling devices as set forth in claim 1 wherein,
   said moisture resistant, resilient, polymeric material comprises a polyvinlchloride composition.

3. An improved corrosion resistant seal for the compression coupling devices as set forth in claim 1 wherein,
   an effective moisture resistant seal between the respective annular flange portions of the male and female coupling members is formed at the position where the threaded portion of the male coupling member initially engages the threaded portion of the female coupling member.

4. An improved corrosion resistant seal for the compression coupling devices as set forth in claim 1 wherein,
   said moisture resistant, resilient, polymeric material coating the male coupling member includes a threaded portion adjacent the external threaded portion of the male coupling member, and
   said threaded portion of polymeric material on the male coupling member engaging the threaded portion of the female coupling member to provide a further seal between the male and female coupling members.

5. An improved corrosion resistant seal for the compression coupling devices as set forth in claim 1 in which,
   increasing contact of the surface areas of the annular flange portions of the respective male and female coupling members of the coupling nut assembly results in converging flange portions as the male coupling member is threadably advanced into the female coupling member.

6. An improved corrosion resistant seal for the compression coupling devices as set forth in claim 1 in which,
   each of said annular flange portions of the respective male and female coupling members of the coupling nut assembly extends radially of the coupling nut assembly to provide a radial seal having substantially abutting flange surface areas forming the completed moisture resistant seal.

7. An improved corrosion resistant seal for the compression coupling devices as set forth in claim 1 in which, said female member includes an annular inner rear surface spaced from said internal threaded portion, said polymeric coating on said female member including an inturned flange portion abutting said annular inner rear surface.

* * * * *